(12) United States Patent
Duda et al.

(10) Patent No.: US 11,178,018 B2
(45) Date of Patent: Nov. 16, 2021

(54) METHOD AND SYSTEM FOR MANAGING REAL NETWORK SYSTEMS USING SIMULATION RESULTS

(71) Applicant: Arista Networks, Inc., Santa Clara, CA (US)

(72) Inventors: Kenneth James Duda, Santa Clara, CA (US); Adam James Sweeney, Santa Clara, CA (US); Sudip Regmi, Fremont, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 16/207,731

(22) Filed: Dec. 3, 2018

(65) Prior Publication Data
US 2020/0106676 A1    Apr. 2, 2020

Related U.S. Application Data

(60) Provisional application No. 62/738,614, filed on Sep. 28, 2018.

(51) Int. Cl.
*G06F 15/177* (2006.01)
*H04L 12/24* (2006.01)
*G06F 9/455* (2018.01)

(52) U.S. Cl.
CPC ........ *H04L 41/145* (2013.01); *G06F 9/45558* (2013.01); *H04L 41/0654* (2013.01); *H04L 41/082* (2013.01); *H04L 41/12* (2013.01); *G06F 2009/45562* (2013.01)

(58) Field of Classification Search
CPC . H04L 41/145; H04L 41/0654; H04L 41/082; H04L 41/12; G06F 9/45558; G06F 2009/45562
USPC .......................................................... 709/220
See application file for complete search history.

(56) References Cited

U.S. PATENT DOCUMENTS

| | | |
|---|---|---|
| 7,299,237 B1 | 11/2007 | Clark et al. |
| 7,586,929 B2 | 9/2009 | Mizutani et al. |
| 7,774,440 B1 * | 8/2010 | Bagrodia ............ H04L 41/0816 703/1 |
| 8,291,468 B1 | 10/2012 | Chickering |
| 8,667,394 B1 | 3/2014 | Spencer |
| 8,874,719 B1 | 10/2014 | Burnett et al. |
| 9,003,292 B2 | 4/2015 | Smith et al. |

(Continued)

FOREIGN PATENT DOCUMENTS

| | | |
|---|---|---|
| CN | 1490979 A | 4/2004 |
| CN | 101553797 A | 10/2009 |

*Primary Examiner* — Wing F Chan
*Assistant Examiner* — Joseph R Maniwang
(74) *Attorney, Agent, or Firm* — Chamberlain, Hrdlicka, White, Williams & Aughtry

(57) ABSTRACT

In general, the invention relates to a method for managing a real network system. The method includes configuring, using Network Device State Information (NDSI) for at least a portion of the real network system, simulated network devices for a simulated network system. The method further includes obtaining simulation conditions for the simulated network system, simulating, using the simulation conditions, operation of the simulated network system to obtain a simulation result, and initiating an update of at least a portion of the real network system corresponding to the simulated network system.

20 Claims, 10 Drawing Sheets

(56) References Cited

U.S. PATENT DOCUMENTS

| | | |
|---|---|---|
| 9,235,802 B1 | 1/2016 | Chamness |
| 9,461,877 B1 | 10/2016 | Nadeau et al. |
| 9,697,172 B1* | 7/2017 | Somohano ............... H04L 45/02 |
| 10,003,629 B2 | 6/2018 | Pech et al. |
| 10,187,286 B2 | 1/2019 | Sigoure |
| 2004/0015609 A1 | 1/2004 | Brown et al. |
| 2004/0255028 A1 | 12/2004 | Chu et al. |
| 2004/0267916 A1 | 12/2004 | Chambliss et al. |
| 2005/0204028 A1* | 9/2005 | Bahl ................... H04L 41/0873 |
| | | 709/223 |
| 2006/0036527 A1 | 2/2006 | Tinnirello et al. |
| 2006/0041494 A1 | 2/2006 | Tinnirello et al. |
| 2006/0041660 A1 | 2/2006 | Bishop et al. |
| 2006/0085507 A1 | 4/2006 | Zhao et al. |
| 2007/0226630 A1 | 9/2007 | Farid et al. |
| 2008/0089237 A1 | 4/2008 | Molen et al. |
| 2009/0172148 A1* | 7/2009 | Underwood ............ H04L 12/66 |
| | | 709/224 |
| 2009/0228586 A1 | 9/2009 | Claise et al. |
| 2013/0235870 A1 | 9/2013 | Tripathi et al. |
| 2014/0075327 A1 | 3/2014 | Noel et al. |
| 2014/0269319 A1 | 9/2014 | DeCusatis et al. |
| 2014/0337000 A1* | 11/2014 | Asenjo ................... G06F 30/20 |
| | | 703/13 |
| 2014/0337467 A1 | 11/2014 | Pech et al. |
| 2015/0074260 A1 | 3/2015 | Anand B.S. et al. |
| 2015/0092561 A1 | 4/2015 | Sigoure |
| 2015/0100675 A1 | 4/2015 | Davie et al. |
| 2015/0277953 A1 | 10/2015 | Xu |
| 2015/0358200 A1 | 12/2015 | Mahajan et al. |
| 2015/0358209 A1 | 12/2015 | Zhang et al. |
| 2016/0057052 A1* | 2/2016 | Zhang ..................... H04L 45/28 |
| | | 709/239 |
| 2016/0154907 A1 | 6/2016 | Halabe et al. |
| 2016/0277272 A1 | 9/2016 | Peach et al. |
| 2016/0373302 A1* | 12/2016 | Sigoure ............... H04L 41/0853 |
| 2017/0004221 A1 | 1/2017 | Olsen |
| 2017/0145061 A1 | 5/2017 | Lu et al. |
| 2017/0250951 A1 | 8/2017 | Wang et al. |
| 2017/0339002 A1 | 11/2017 | Sigoure et al. |

\* cited by examiner

METHOD AND SYSTEM FOR MANAGING REAL NETWORK SYSTEMS USING SIMULATION RESULTS

CROSS-REFERENCE TO RELATED APPLICATIONS

This application claims priority under 35 U.S.C. § 119(e) to U.S. Provisional Patent Application No. 62/738,614, filed Sep. 28, 2018, which is incorporated herein by reference in its entirety.

BACKGROUND

Modern networks typically include a large number network devices (e.g., switches, multilayer switches, and/or routers), each interacting with one or more other network devices. These modern networks are complex systems, which are difficult to configure and manage.

SUMMARY

In general, in one aspect, the invention relates to a method for managing a real network system. The method includes configuring, using Network Device State Information (NDSI) for at least a portion of the real network system, a plurality of simulated network devices for a simulated network system, obtaining simulation conditions for the simulated network system, simulating, using the simulation conditions, operation of the simulated network system to obtain a simulation result, and initiating an update of at least a portion of the real network system corresponding to the simulated network system.

In general, in one aspect, the invention relates to a coordination point. The coordination point comprises a processor, memory, a simulation system, at least a portion of which is executing on the processor, a network state database stored in memory and comprising network device state information (NDSI) for a real network system, a coordination point management agent executing on the processor, wherein the simulation system is configured to: configure, using the NDSI, a plurality of simulated network devices for a simulated network system, obtain simulation conditions for the simulated network system, simulate, using the simulation conditions, operation of the simulated network system to obtain simulated NDSI, and wherein the coordination point management agent is configured to initiate, based on the simulated NDSI, an update of at least a portion of a real network system corresponding to the simulated network system.

In general, in one aspect, the invention relates to a non-transitory computer readable medium comprising instructions, which when executed by a processor, perform a method, the method comprising configuring, using Network Device State Information (NDSI) for at least a portion of a real network system, a plurality of simulated network devices for a simulated network system, obtaining simulation conditions for the simulated network system, simulating, using the simulation conditions, operation of the simulated network system to obtain a simulation result, and initiating an update of at least a portion of the real network system corresponding to the simulated network system.

In general, in one aspect, the invention relates to a method for managing a real network system, comprising configuring, using Network Device State Information (NDSI) for at least a portion of the real network system, a plurality of simulated network devices for a simulated network system, obtaining simulation conditions for the simulated network system, simulating, using the simulation conditions, operation of the simulated network system to obtain a simulation result, and issuing a notification to a user of the real network system, wherein content in the notification is based, at least in part, on the simulation result.

Other aspects of the invention will be apparent from the following description and the appended claims.

DETAILED DESCRIPTION

Figure 1A:
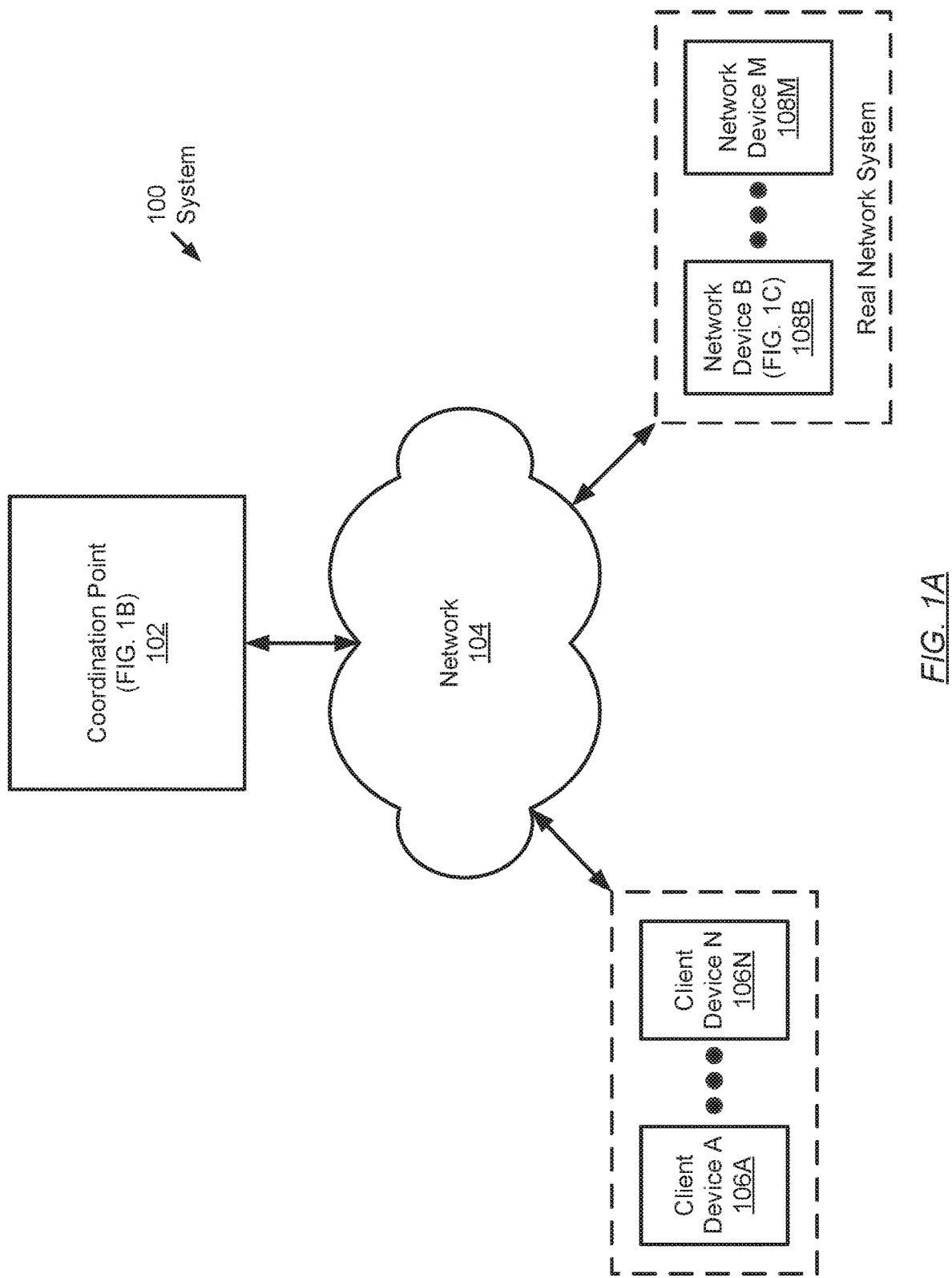
FIG. 1A shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method and system for managing a real network system. More specifically, embodiments of the invention relate to simulating a real network system and then using the simulation results to configure and manage the network. The simulation of the real network system, in accordance with one or more embodiments of the invention, is performed using the actual hardware configuration, software configuration, and connectivity of the real network system. The simulation may involve, but is not limited to, simulating: (i)

potential changes to the real network system (e.g., changes in topology), (ii) potential changes to the hardware and/or software on one or more real network devices in the real network system; and (iii) interaction of the real network system with external systems (e.g., network management systems). Once the simulation results have been obtained, the simulation results may be used to, e.g., (i) update one or more real network devices in the real network system and (ii) monitor the operation of the real network system and determine whether it is behaving as simulated. In scenarios in which the real network system is not behaving as simulated, then corrective action may be initiated.

FIG. 1A shows a system in accordance with one or more embodiments of the invention. The system (100) includes a coordination point (102) operatively connected to one or more client device(s) (106A, 106N) and one or more real network device(s) (108B, 108M) (the one or more real network devices may be collectively referred to as real network system) through a network (104). Each of these components is described below.

In one embodiment of the invention, the coordination point (102) may be one or more computing devices that manage a set of real network devices (e.g., 108B, 108M). In one embodiment of the invention, each computing device is any physical or virtual device that may be used for performing various embodiments of the invention. The physical device may correspond to any physical system (see e.g., FIG. 6) with functionality to implement one or more embodiments of the invention. For example, the physical device may be a server (i.e., a device with at least one or more processor(s), memory, and an operating system) that is directly (or operatively, e.g., via the network) connected to at least one client device (e.g., 106A, 106N) and at least one real network device (e.g., 108B, 108M).

Alternatively, the physical device may be a special purpose computing device that includes one or more application-specific processor(s) (or hardware) configured to only execute embodiments of the invention. In such cases, the physical device may implement embodiments of the invention in hardware as a family of circuits and may retain limited functionality to receive input and generate output in accordance with various embodiments of the invention. In addition, such computing devices may use a state-machine to implement various embodiments of the invention.

In another embodiment of the invention, the physical device may correspond to a computing device that includes one or more general purpose processor(s) and one or more application-specific processor(s) (or hardware). In such cases, one or more portions of the invention may be implemented using the operating system and general purpose processor(s), while one or more portions of the invention may be implemented using the application-specific processor(s) (or hardware).

In one embodiment of the invention, the coordination point (102) may be implemented using one or more virtual machines. Broadly speaking, virtual machines are distinct operating environments configured to inherit underlying functionality of the host operating system (and access to the underlying host hardware) via an abstraction layer. In one or more embodiments of the invention, a virtual machine includes a separate instance of an operating system, which is distinct from the host operating system. For example, one or more embodiments of the invention may be implemented on VMware® architecture involving: (i) one or more virtual machines executing on a host computer system such that each virtual machine serves as a host to an instance of a guest operating system; and (ii) a hypervisor layer serving to facilitate intra-host communication between the one or more virtual machines and the host computer system hardware. Alternatively, one or more embodiments of the invention may be implemented on Xen® architectures involving: (i) a control host operating system (e.g., Dom 0) including a hypervisor; and (ii) one or more virtual machines (e.g., Dom U) executing guest operating system instances. VMware® is a registered trademark of VMware, Inc. Xen® is a trademark overseen by the Xen Project Advisory Board. In another embodiment of the invention, the coordination point (102) may be implemented using one or more containers. A container is an isolated execution environment that executes on an operating system. Unlike virtual machines, which each execute on their own isolated operating system, containers executing on a single computing device and share the same underlying operating system.

In one embodiment of the invention, the coordination point (102) may be implemented using one or more virtual instances (e.g., one or more virtual machines or one or more containers) executing on a real network device. In another embodiment of the invention, the coordination point may be implemented in one or more virtual machines or containers executing on a server that is operatively (via the network) (or directly) connected to one or more client device(s) (e.g., 106A, 106N in FIG. 1A) and/or one or more real network device(s).

In one embodiment of the invention, the coordination point (102) includes executable instructions (stored in a non-transitory computer readable medium (not shown)), which when executed, enable the coordination point to perform the methods described below (see e.g., FIGS. 2-4). Additional detail about the coordination point is described below with respect to FIG. 1B.

In one embodiment of the invention, the one or more client device(s) (106A, 106N) may each be a computing device (see e.g., FIG. 6) or virtual instance (discussed above) that is configured to interact with the coordination point (102). In one embodiment of the invention, a client device includes functionality to provide user configuration parameters (see e.g., FIGS. 2-3) and to receive notifications issued by the coordination point (see e.g., FIG. 4).

In one embodiment of the invention, the one or more real network device(s) (108B, 108M) are physical devices that include persistent storage, memory (e.g., random access memory), one or more processor(s) (including a switch chip), and two or more physical ports. In one embodiment of the invention, the switch chip is hardware that determines which egress port on a real network device to forward media access control (MAC) frames. The switch chip may include egress and ingress ports that may connect to ports on the real network device. Each port may or may not be connected to another device on a real network device on the network (104) (e.g., a server, a switch, a router, etc.). The real network device may be configured to receive packets via the ports and determine whether to: (i) drop the packet; (ii) process the packet in accordance with one or more embodiments of the invention; and/or (iii) send the packet, based on the processing, out another port on the real network device.

How the real network device makes the determination about whether to drop the packet, and/or send the packet to another device on the network depends, in part, on whether the real network device is a layer-2 (L2) switch or a layer-3 (L3) switch (also referred to as a multilayer switch), which may perform at least some functions of a router. If the real network device is operating as a L2 switch, the real network device uses the destination MAC address along with a forwarding table to determine out of which port to send the packet. If the real network device is operating as a L3 switch, the real network device uses the destination Internet Protocol (IP) address along with a routing table to determine out of which port to send the packet, and includes the ability to write the MAC address of the next device to receive the packet in place of its own MAC address (which the last device to send the packet wrote) in the L2 information encapsulating the packet. If the real network device is a multilayer switch, the multilayer switch includes functionality to process packets using both MAC addresses and IP addresses.

Figure 2:
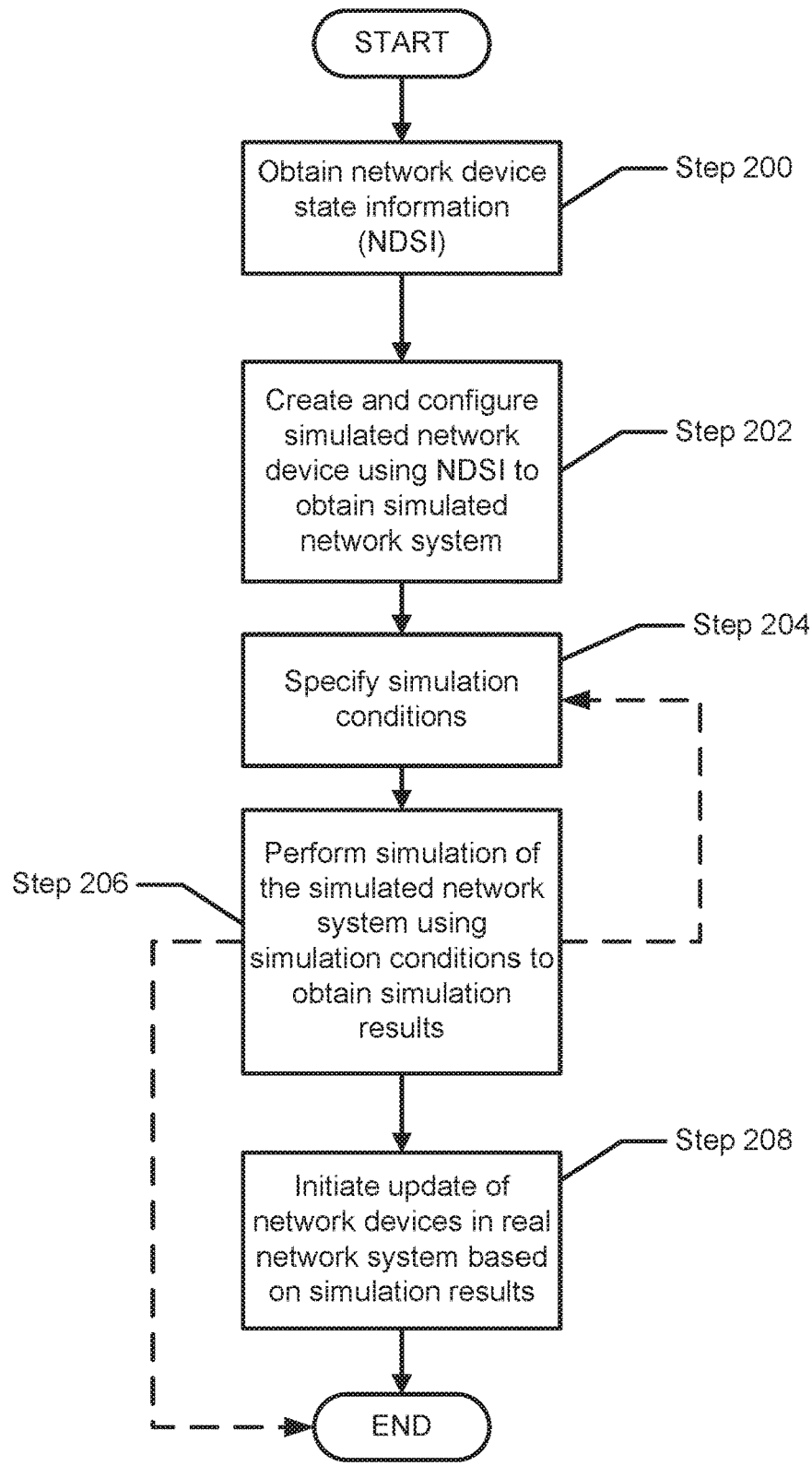
FIG. 2 shows a flowchart for managing a real network system using simulations results in accordance with one or more embodiments of the invention.
Figure 3:
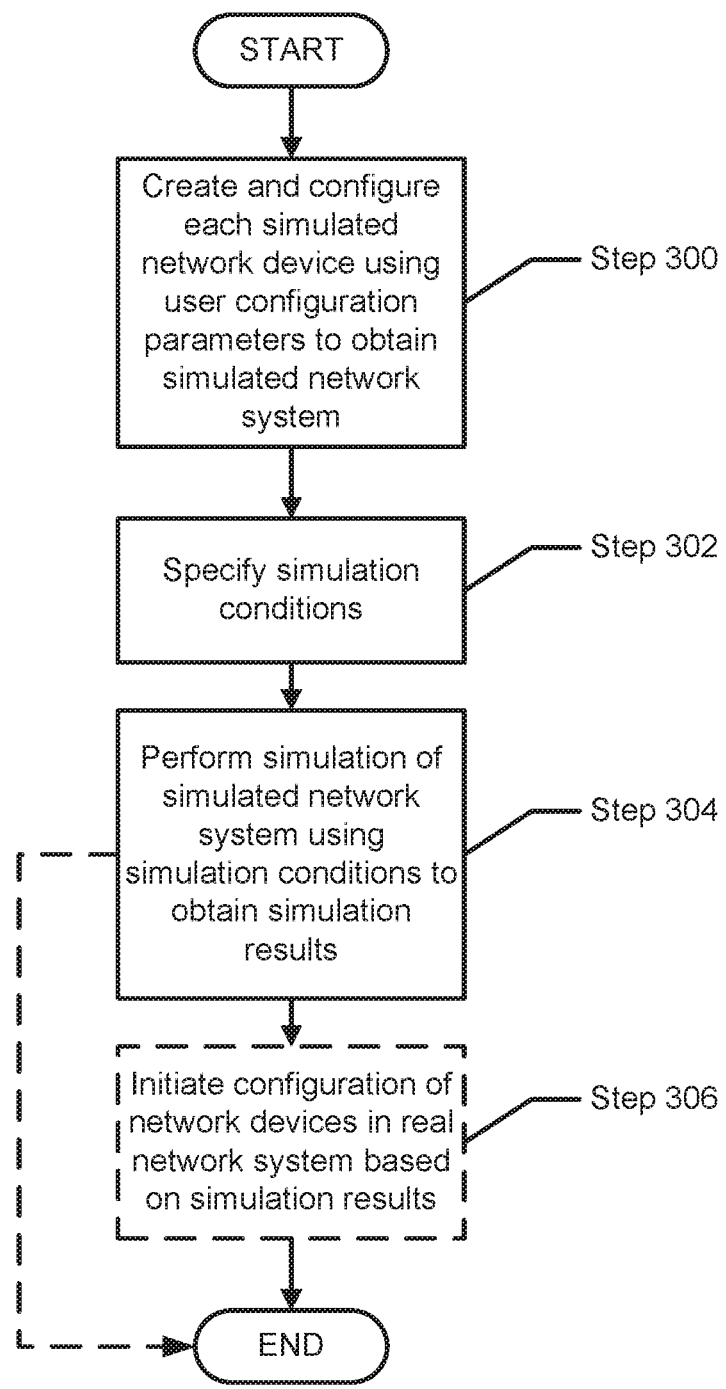
FIG. 3 shows a flowchart for configuring a real network system using simulations results in accordance with one or more embodiments of the invention.
Figure 4:
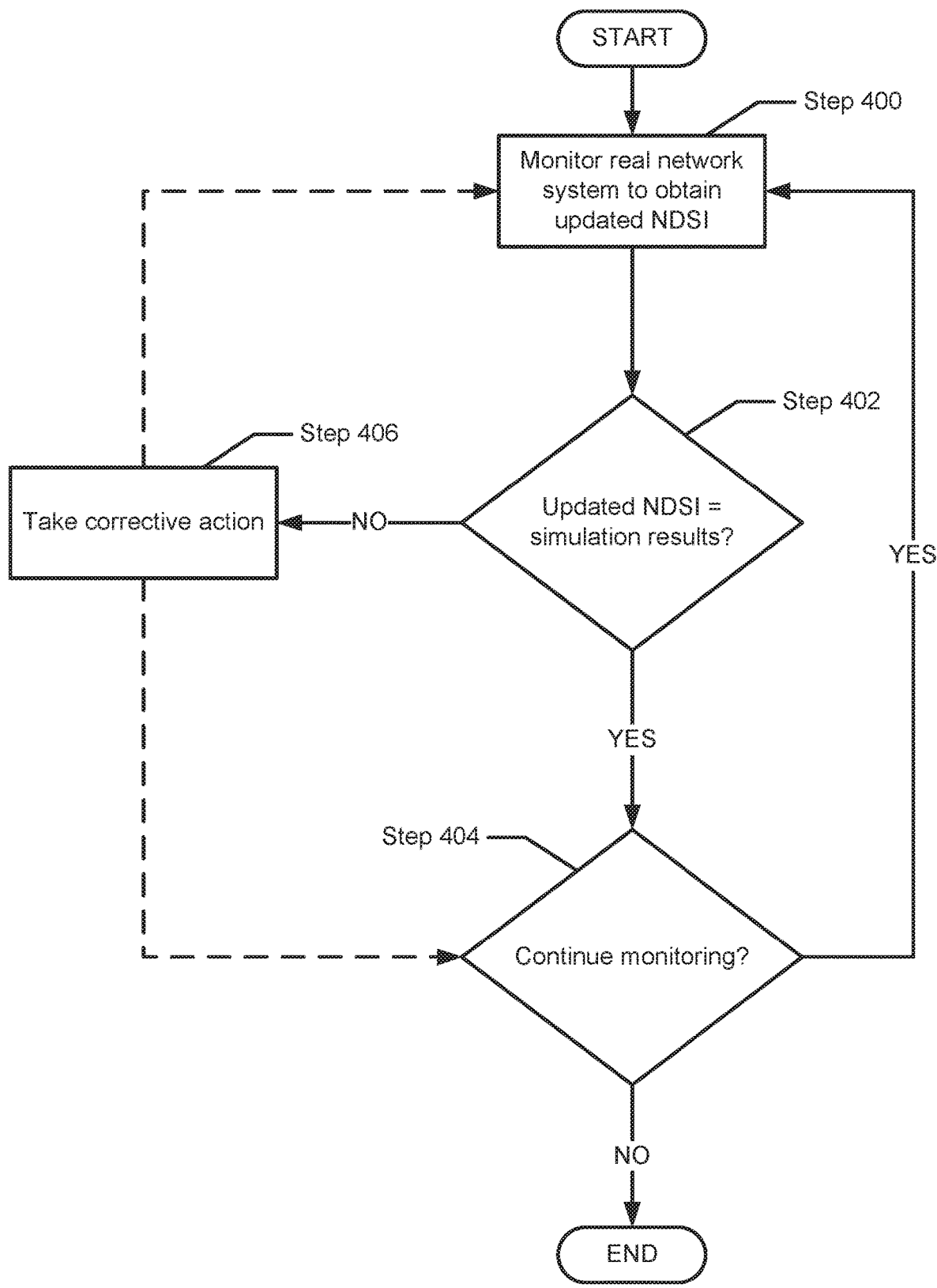
FIG. 4 shows a flowchart for detecting errors in a real network using simulation results in accordance with one or more embodiments of the invention.

In one embodiment of the invention, the persistent storage in the real network device may include any type of non-transitory computer readable medium that includes instructions, which, when executed by one or more processor(s) in the real network device, enable the real network device to perform functions described in accordance with one or more embodiments of the invention (see e.g., FIGS. 2-4).

Examples of real network devices include, but are not limited to, a router, a switch, and a multilayer switch. The real network device is not limited to the aforementioned specific examples. Additional detail about a real network device is described below with respect to FIG. 1C.

In one embodiment of the invention, the network (104) may be the medium through which the coordination point (102), the one or more client device(s) (106A, 106N), and the one or more real network device(s) (108B, 108M) are operatively connected. In one embodiment of the invention, the network may include other real network devices (or systems) (not shown) that facilitate communication between the aforementioned components. As such, in one embodiment of the invention, the network may include any combination of local and/or wide area (e.g., Internet) network segments that may be wire-based and/or wireless and that may use any combination of wired and/or wireless communication protocols.

The invention is not limited to the system shown in FIG. 1A. More specifically, while the system shown in FIG. 1A includes a single coordination point, embodiments of the invention may be implemented using multiple coordination points, where the multiple coordination points are configured such that if one of the multiple coordination points fails, the other coordination points may continue to operate and provide the functionality described below (see e.g., FIGS. 2-4) to the client entities (e.g., client devices or client processes (described below)) and the real network devices.

Figure 1B:
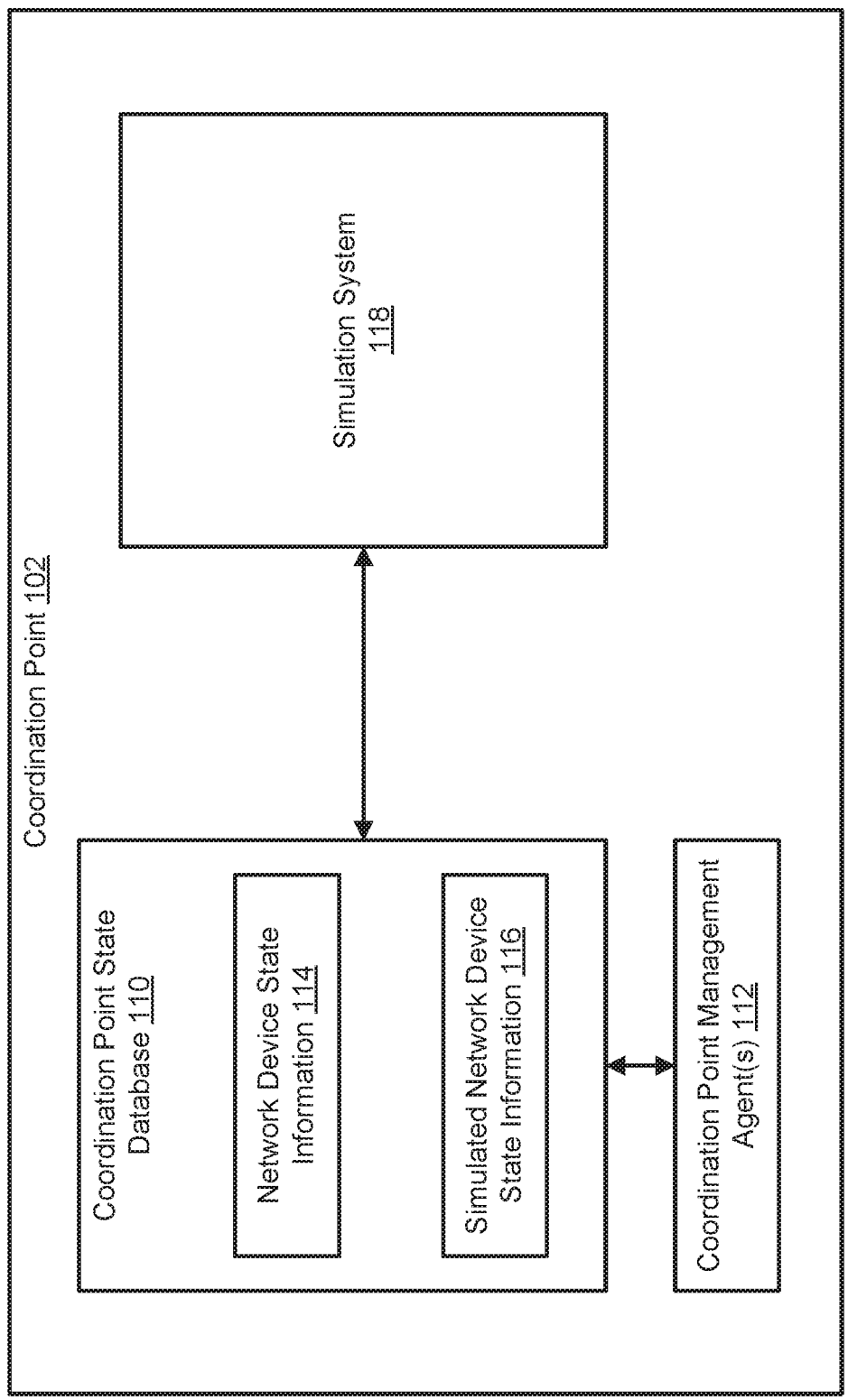
FIG. 1B shows a coordination point in accordance with one or more embodiments of the invention.

FIG. 1B shows a coordination point in accordance with one or more embodiments of the invention. The coordination point (102) includes a coordination point state database (110), one or more coordination point management agents (112), and a simulation system (118). Each of these components is described below.

In one embodiment of the invention, the coordination point state database (110) includes the state of each of the real network devices (see e.g., 108B, 108M in FIG. 1A) which the coordination point (102) manages. Said another way, the coordination point state database may serve as a repository to consolidate state information pertaining to each of the real network devices under the supervision of the coordination point. The aforementioned information may be collectively referred to as network device state information (NDSI). In one embodiment of the invention, the state of each of the real network devices (also referred to as the NDSI for each of the real network devices) may include: (i) state information that has been provided to the coordination point by the real network device; and (ii) the state information obtained from the one or more client devices (see e.g., FIG. 1A) that is being sent to (or is scheduled to be sent to) the real network device. Accordingly, the state of a real network device (as specified in the network device state database (see e.g., 120 in FIG. 1C)) and the state of the real network device maintained in the coordination point state database may be different. The aforementioned differences may be the result of state changes that have been made on the real network device that have not been propagated to the coordination point and/or state changes that are scheduled to be sent to the real network device but have yet to be sent.

In one embodiment of the invention, the coordination point state database (110) may be implemented using any type of database (e.g., a relational database, a distributed database, etc.). Further, the coordination point state database may be implemented in-memory (i.e., the contents of the coordination point state database may be maintained in volatile memory). Alternatively, the coordination point state database may be implemented using persistent storage. In another embodiment of the invention, the coordination point state database may be implemented as an in-memory database with a copy of the coordination point state database being stored in persistent storage. In such cases, as changes are made to the in-memory database, copies of the changes (with a timestamp) may be stored in persistent storage. The use of an in-memory database may provide faster access to the contents of the coordination point state database.

Those skilled in the art will appreciate that while the term "database" is used above, the coordination point state database (110) may be implemented using any known or later developed data structure(s) to manage and/or organize the content in the coordination point state database.

In one embodiment of the invention, the state information of the real network device(s) that is stored in the coordination point state database (110) may include, but is not limited to: (i) information about (and/or generated by) all (or a portion of) services currently executing on the real network device; (ii) the version of all (or a portion of) software executing on the real network device; (iii) the version of all (or a portion of) firmware on the real network device; (iv) hardware version information for all (or a portion of) hardware in the real network device; and (v) information about all (or some) of the services, protocols, and/or features configured on the real network device (e.g., show command service (SCS), multi-chassis link aggregation (MLAG), link aggregation control protocol (LACP), virtual extensible local area network (VXLAN), link layer discovery protocol (LLDP), tap aggregation, data center bridging (DCB) capability exchange, access control list (ACL), virtual local area network (VLAN), virtual router redundancy protocol (VRRP), virtual address resolution protocol (VARP), spanning tree protocol (STP), open shortest path first (OSPF), border gateway protocol (BGP), routing information protocol (RIP), bidirectional forwarding detection (BFD), multiprotocol label switching (MPLS), protocol independent multicast (PIM), Internet control message protocol (ICMP), Internet group management protocol (IGMP), etc.), where this information may include information about the current configuration and status of each of the services, protocols, and/or features. In one embodiment of the invention, the coordination point state database includes control plane state information associated with the control plane of the real network device (e.g., the current list of static routes, current contents of the routing information base (RIB), the current content of the link state database, the current contents of the neighbor table, etc.). Further, in one embodiment of the invention, the coordination point state database includes data plane state information associated with the data plane of the real network device (e.g., the current contents of the forwarding information base (FIB)). The coordination point state database may include other information without departing from the invention.

In one embodiment of the information, the state of the real network device (i.e., the NDSI of the real network device) may be stored with a timestamp. As discussed below, the use of the timestamp in combination with the NDSI may be used to determine the state of the real network system (or of given devices in the real network system) at specific points in time and whether the real system is operating in a manner similar (or substantially similar) to the simulated network system (or vice versa).

In one embodiment of the invention, the state information in the coordination point may be shared with one or more real network device(s) using an asynchronous replication mechanism. More specifically, when state information is changed in the coordination point, the changed state information is first stored in the coordination point state database, and then a copy of the changed state information is transmitted to the one or more real network device(s). The transmission of the state information to the one or more real network devices may involve pushing the updated state information, by one of the coordination point management agents (112), to the one or more real network devices. Additionally, or alternatively, the transmission of the state information to the one or more real network devices may involve sending a notification, by one of the coordination point management agents (112), to the one or more real network devices. In response to receiving the notification, a network device agent (118) subsequently pulls the updated state information from the coordination point database.

In one embodiment of the invention, the coordination point management agent(s) (112) interacts with the coordination point state database (110). Each coordination point management agent facilitates the implementation of one or more protocols, services, and/or features of the coordination point (102). Examples of coordination point agents, include, but are not limited to, a bug-alerts agent, a policy agent that manages access control lists, a user interface agent, a routing information base agent, a forwarding information base agent, and a simple network management protocol (SNMP) agent. Furthermore, each coordination point agent includes functionality to access various portions of the coordination point state database (110) in order to obtain the relevant portions of the state of one or more real network device(s) in order to perform various functions. Additionally, each coordination point agent includes functionality to update the state of the one or more real network device(s) by writing new and/or updated values in the coordination point state database, corresponding to one or more variables and/or parameters that are currently specified in the one or more real network device(s).

One or more of the coordination point management agents (112) may also include functionality to detect the aforementioned changes to the coordination point database and propagate (or initiate propagation of) these changes to the appropriate real network device(s).

In one embodiment of the invention, the coordination point includes a simulation system (118). The simulation system may be implemented entirely within the coordination point (112). In such scenarios, the simulation system may be implemented using one or more virtual instances (e.g., virtual machines or containers). In these scenarios, one or more virtual instances may be used to manage the simulation while the remainder of the virtual instances may be used to simulate the real network devices (e.g., simulate network devices corresponding to real network devices in the real network system and/or simulating network devices for a proposed real network system). Additional detail about the simulation of the real network devices is described below in FIGS. 2-3 and 5.

In another embodiment of the invention, the simulation system (118) may be implemented externally from the coordination point. In this scenario, one or more virtual instances on the coordination point may be used to manage the simulation while other computing devices and/or virtual instances external to the coordination point may perform the simulation.

Regardless of how the simulation system is implemented, the simulation of the real network system results in the generation of simulation results. The simulation results may include NDSI for each of the simulated network devices. Further, the NDSI may be timestamped such that for each simulated network device there is a set of NDSI. In this manner, the state of the simulated network device may be tracked overtime. Further, embodiments of the invention enable the simulation system to simulate the real network system under various simulation conditions (discussed below, see e.g., FIGS. 2-3). Accordingly, the NDSI for each of the simulated network devices may be also be associated with simulation conditions. This information may be used to further differentiate the various simulated NDSI for a given simulated network device.

The simulation results for one or more simulations (collectively referred to as Simulated Network Device State Information (116)) may be stored in coordination point database (110).

Figure 1C:
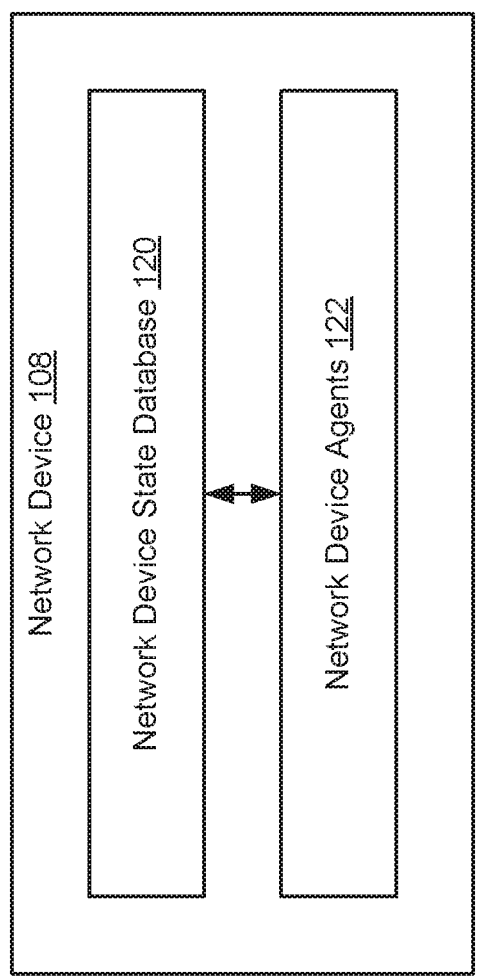
FIG. 1C shows a network device in accordance with one or more embodiments of the invention.

FIG. 1C shows a real network device in accordance with one or more embodiments of the invention. The real network device (108) includes a network device state database (120) and one or more a network device agents (122). Each of these components is described below.

In one embodiment of the invention, the network device state database (116) includes the current state of the real network device (108). The state information stored in the network device state database may include, but is not limited to: (i) information about (and/or generated by) all (or a portion of the) services currently executing on the real network device; (ii) the version of all (or a portion of the) software executing on the real network device; (iii) the version of all firmware on the real network device; (iv) hardware version information for all (or a portion of the) hardware in the real network device; (v) information about the current state of all (or a portion of the) tables (e.g., routing table, forwarding table, etc.) in the real network device that are used to process packets, where information may include the current entries in each of the tables, and (vi) information about all (or a portion of the) services, protocols, and/or features configured on the real network device (e.g., show command service (SCS), MLAG, LACP, VXLAN, LLDP, tap aggregation, data center bridging capability exchange, ACL, VLAN, VRRP, VARP, STP, OSPF, BGP, RIP, BDF, MPLS, PIM, ICMP, IGMP, etc.), where this information may include information about the current configuration and status of each of the services, protocols, and/or features. In one embodiment of the invention, the network device state database includes control plane state information (discussed above) associated with the control plane of the real network device. Further, in one embodiment of the invention, the network device state database includes data plane state information (discussed above) associated with the data plane of the real network device.

The network device state database may include other information without departing from the invention.

In one embodiment of the invention, the network device state database (116) may be implemented using any type of database (e.g., a relational database, a distributed database, etc.). Further, the network device state database may be implemented in-memory (i.e., the contents of the network device state database may be maintained in volatile memory). Alternatively, the network device state database may be implemented using persistent storage. In another embodiment of the invention, the network device state database may be implemented as an in-memory database with a copy of the network device state database being stored in persistent storage. In such cases, as changes are made to the in-memory database, copies of the changes (with a timestamp) may be stored in persistent storage. The use of an in-memory database may provide faster access to the contents of the network device state database.

Those skilled in the art will appreciate that while the term "database" is used above, the network device state database (116) may be implemented using any known or later developed data structure(s) to manage and/or organize the content in the network device state database.

In one embodiment of the invention, the state information from the individual network devices may be shared with the coordination point using an asynchronous replication mechanism. More specifically, when state information is changed in the real network device, the changed state information is first stored in the network device state database, and then a copy of the changed state information is transmitted (via a push or pull mechanism) to the coordination point.

In one embodiment of the invention, one or more network device agents (118) interact with the network device state database (116). Each network device agent facilitates the implementation of one or more protocols, services, and/or features of the real network device (108). Examples of network device agents, include, but are not limited to, a routing information base agent, a forwarding information base agent, and a simple network management protocol (SNMP) agent. Furthermore, each network device agent includes functionality to access various portions of the network device state database (116) in order to obtain the relevant portions of the state of the real network device in order to perform various functions. Additionally, each network device agent includes functionality to update the state of the real network device by writing new and/or updated values in the network device state database, corresponding to one or more variables and/or parameters that are currently specified in the real network device.

One skilled in the art will recognize that the architecture of the system, a coordination point, a real network device, and of the network is not limited to the components shown in FIGS. 1A-1C. For example, the network may include any number and any type of real network devices participating in the sharing of states. Further, the coordination point and the real network devices may include components not shown in FIGS. 1B and 1C, respectively.

FIGS. 2-4 show flowcharts in accordance with one or more embodiments of the invention. While the various steps in the flowcharts are presented and described sequentially, one of ordinary skill will appreciate that some or all of the steps may be executed in different orders, may be combined or omitted, and some or all steps may be executed in parallel. In one embodiment of the invention, the steps shown in FIGS. 2-4 may be performed in parallel with any other steps shown in FIGS. 2-4 without departing from the invention.

FIG. 2 shows a flowchart for managing a real network system using simulations results in accordance with one or more embodiments of the invention.

In step 200, the network device state information (NDSI) for real network devices in the real network system is obtained. As discussed above, the coordination point state database includes the NDSI for the real network devices in the real network system and is updated using an asynchronous update mechanism. Accordingly, the NDSI for the real network devices at the coordination point should be the same or substantially the same as the NDSI stored locally on the individual real network devices.

In another embodiment of the invention, coordination point does not maintain the NDSI for the real network devices of the real network system; rather, the coordination point may only track which real network devices are part of the real network system. In such embodiments, when a simulation is to be performed for all or a portion of the real network system, the simulation system (118) (which may be located in the coordination point or external to the coordination point) may notify the coordination point to request that all (or a portion) of the real network devices in the real network system provide their specific NDSI to the coordination point. Upon receipt of the NDSI by the coordination point, the coordination point provides the NDSI to the simulation system. In this scenario, the coordination point may be referred to as a stateless coordination point as it does not store any of the NDSI locally (except as required to: (i) run the simulation if the simulation system is located in the coordination point or (i) provide it to the simulation system if the simulation system is external to the coordination point); rather, the coordination point obtains the NDSI (via a push or pull mechanism) as-needed in order to provide the NDSI to the simulation system.

Regardless of how the NDSI is obtained, the method may be proceed to step 202 in which the NDSI (or a portion thereof) is used. Specifically in step 202, a virtual instance (e.g., a virtual machine or a container) is created and configured for each of the real network devices to be simulated using the NDSI. More specifically, the simulation system is configured to create and configure a set of virtual instances, where each of the virtual instances corresponds to a real network device in the real network system being simulated. The virtual instances, once configured, may be referred to as simulated network devices.

In one embodiment of the invention, the hardware configuration simulated in the virtual instances may correspond to using one or more hardware models, where each of the hardware models corresponds to one or more actual hardware components in the corresponding real network device. Said another way, the hardware models used in the virtual instance (i.e., the virtual instance corresponding to a real network device being simulated) enable the virtual instance to simulate the specific line cards, processors, transceivers, switch chips, and any other hardware component in the real network devices.

In one embodiment of the invention, the software obtained and configured in the virtual instance corresponds to the actual software that is currently executing on the corresponding real network device, where the configuration of the software executing on the virtual instance corresponds to the configuration used in the corresponding real network device.

In addition to using the NDSI to specify the hardware and software configurations to simulate in the virtual instance, the NDSI is also used to specify the network connectivity. For example, consider a scenario in which there are three real network devices in the real network system that are to be simulated. In this scenario, the NDSI is used to configure three virtual instances (one corresponding to each of the three real network devices). Further, using information obtained from protocols such as LLDP, the physically connectivity (e.g., which ports on a first real network device are physically connected to which ports on the second and/or third real network device) between the real network devices in the real network system are also simulated.

The result of step 202 is a set of virtual instances which is intended to mirror the real network system (or portion thereof) being simulated. The aforementioned set of virtual instances (also referred to as simulated network devices) may be collectively referred to as a simulated network system.

In step 204, simulation conditions to be used in the simulated network system simulation are obtained. The simulation conditions may include, but are not limited to: (i) specifying network management tools to be used in the simulation; (ii) specifying the number, type, headers, and/or payloads of packets to be simulated along with which of the simulated network devices (i.e., the virtual instances simulating the real network devices) will be issuing the aforementioned packets; (iii) a new hardware configuration to be simulated on one or more of the virtual instances, where the new hardware configuration may include: (a) modifying a configuration of an existing hardware component, (b) replacing an existing hardware component with a different hardware component, and/or (c) adding an additional hardware component to be simulated on the virtual instance; (iv) a new software configuration to be simulated on one or more of the virtual instances, where the new software configuration may include: (a) modifying a configuration of an existing software component (e.g., modifying a parameter for a specific protocol being simulated on the virtual instance), (b) replacing an existing software component with a different software component (e.g., changing the current routing protocol being implemented on the switch to another routing protocol), and/or (c) adding an additional software component to be simulated on the virtual instance (e.g., adding a new real network device management agent); (v) modifying the topology of the simulated network system, which may include, but is not limited to: (a) changing the connectivity between existing virtual instances; (b) adding or removing one or more virtual instances from the simulated network system and then updating the connectivity of the remaining virtual instances based on this change; and/or (vi) specify a failed state for one or more of the virtual instances. In one embodiment of the invention, a failed state may correspond to simulating the failure of all or any component (hardware or software) of a virtual instance.

In step 206, a simulation is performed on the simulated network system using the simulation conditions specified in step 204. The result of performing the simulation is simulation results (also referred to as simulated NDSI), which are stored in the coordination point database.

In one embodiment of the invention, the simulation system enables a user (e.g., via a client device) to interact with the virtual instances in the same manner the user would interact with real network devices in the real network system. This interaction may include using network debugging tools and/or management tools in order to debug and/or manage the virtual instances.

The simulation in step 206 may be used to: (i) validate that the network management systems are working properly with the simulated network system; (ii) validate control plane protocols and/or behavior, and/or (iii) validate data plane behavior. The simulation of the simulated network system may be used for other purposes without departing from the invention.

In certain scenarios, the user may be performing simulations to test various simulation conditions in order to gather data for offline processing. In such scenarios, the steps 204-206 may be repeated using different simulation conditions. Once the simulations have been completed the process ends.

In other scenarios, the user may be performing simulations in order to debug modifications to the simulated network systems (where the modifications are specified in the simulation conditions). In such scenarios, a simulation is performed on the simulated network system. The user may then analyze the simulation results to determine whether the simulated network system is performing as expected. If the simulated network system does not perform as expected during the simulation, e.g., there are unexpected behaviors in the control plane and/or data plane, then the process may proceed back to step 204. Specifically, the user may be prompted or receive a notification to modify one or more simulation conditions. In scenarios in which the user receives a notification, the notification may include some or all of the following content: information about which of the one or more portions of the simulated network system (which corresponds to real network devices or proposed simulated network device (see e.g., FIGS. 5A-5D)) have failed, the specific nature of the failure (e.g., the routing table capacity of a simulated network device will be exceeded), the cause of the failure(s), and possible options to correct the failure. The user may use this information to generate modified simulation conditions.

If the user generates and/or provides modified simulation conditions, then a subsequent simulation may be performed using the modified simulation conditions. This process may be repeated until the simulated network system performs as expected (e.g., the packets are being forwarded by the data plane as expected, the protocols in the control plane are operating as expected, etc.). At this stage, the process may proceed to step 208.

In step 208, the coordination point may initiate the updating of one or more real network devices based on the simulation results. In one embodiment of the invention, once the simulated network system is operating as expected (as reflected in the simulation results), the NDSI in the coordination point is updated to correspond to the configurations (as specified in the simulation conditions) used to obtained the simulation results. As discussed above, the update to the NDSI in the coordination point database triggers an update to the NDSI locally stored on the corresponding real network devices. Once the NDSI on the real network devices is updated, the real network devices use updated NDSI to modify their individual configurations. In another embodiment of the invention, initiating the updating of one or more real network devices may include sending a notification to a user (e.g., an administrator) to manually update (or manually initiate an update on) one or more real network devices. The notification may include an email or any other electronic communication. Further, the notification may include information about which real network devices to update and proposed configurations of these real network devices.

FIG. 3 shows a flowchart for configuring a real network system using simulations results in accordance with one or more embodiments of the invention. In one embodiment of the invention, the method shown in FIG. 3 may be used to simulate a proposed real network system. In these scenarios, the user may simulate different proposed real network systems in order to determine an appropriate configuration for a real network system. Once an appropriate configuration has been confirmed, the configuration used in the simulation (i.e., the hardware configuration, software configuration, and topology) may be implemented in a real network system.

Turning to FIG. 3, in step 300, a virtual instance (e.g., a virtual machine or a container) is created and configured for each of the real network device to be simulated. The creation and configuration performed in step 300 is substantially similar to the creation and configuration performed in step 202 except the creation and configuration performed in step 300 is based on user configuration parameters. The user configuration parameters may correspond to any parameters provided by the user. The user may provide any information, at level of granularity, to be used in the simulation. For example, the user may provide parameters related to hardware configuration, software configuration, and/or connectivity (i.e., network topology). To the extent that the user has not provided any information that would be required to perform the simulation, the simulation system may use default configuration parameters. The default configuration parameters may be set on a per user, per set of users, on a system-wide basis, or on any other basis. In one embodiment of the invention, the simulation system may provide the ability to allow a user to select pre-configured virtual instances. In such cases, the user configuration parameters may include selection of zero, one or more pre-configured virtual instances.

In step 302, simulation conditions to be used in the simulated network system simulation are obtained. Step 302 is substantially similar to set 204 in FIG. 2.

In step 304, a simulation of the simulated network system is performed using the simulation conditions specified in step 302. Step 304 is performed in a manner that is substantially similar to step 204.

In step 306, the coordination point may initiate the configuration of one or more real network devices based on the simulation results. Step 306 is performed in a manner that is substantially similar to step 208.

FIG. 4 shows a flowchart for detecting errors in a real network system using simulation results in accordance with one or more embodiments of the invention. The method shown in FIG. 4 may be performed after: (i) the updates that were initiated in step 208 have been completed or (ii) the configuration that was initiated in step 306 has been performed.

Turning to FIG. 4, in step 400, the real network system is monitored in order to obtain updated NDSI. More specifically, as discussed above, changes on the real network device (e.g., changes to the hardware configuration, software configuration, topology, state of the control plane, state of the data plane, etc.) trigger an update to the network device state database on each of the real network devices. These changes to network device state databases on each of the real network devices is then propagated (via a push or pull mechanism) to the coordination point. In this manner, the coordination point continuously obtains real time or near real time information about any changes to the real network devices. The aforementioned information received from the individual real network devices may be collectively referred to as updated NDSI and stored in the coordination point database.

In step 402, a determination is made about whether the updated NDSI is the same or substantially similar to the simulation results. The determination in step 402 may be made using all or a portion of the NDSI and the corresponding simulated NDSI. The following describes various non-limiting scenarios which may occur in step 402.

Scenario 1

Consider a scenario in which a simulation of a real network system is performed, where the simulation focused on changes to the Border Gateway Protocol (BGP) implementation in Network Device A. The simulated NDSI generated by the simulation includes the state of the control plane at various points in time. After the simulation has been completed and, in accordance with Step 208, an updated configuration for Network Device A is initiated.

After the configuration of Network Device A has been updated, the coordination point starts receiving updated NDSI. The updated NDSI includes, among other information, the state of the control plane on Network Device A at various points in time. In this scenario, at step 402, the state of the control plane at time T1 is compared to the corresponding state of the control plane at ST1 (i.e., simulation T1; said another way, time T1 of the simulation of the corresponding simulated network system) that is stored as simulated NDSI in the coordination point database. If the state of the control plane for Network Device A is the same as the state of the control plane obtained during the simulation, then Network Device A may be determined to be operating as expected (i.e., in the same manner as simulated) and the process proceeds to step 404. Alternatively, if the state of the control plane for Network Device A is not the same as the state of the control plane obtained during the simulation, then Network Device A may be determined to not be operating as expected (i.e., not in the same manner as simulated) and the process proceeds to step 406.

Scenario 2

Consider a scenario in which a simulation of a real network system is performed, where the simulation focused on changes to the BGP implementation in Network Device A. The simulated NDSI generated by the simulation includes the state of the control plane at various points in time. After the simulation has been completed and, in accordance with Step 208, an updated configuration for Network Device A is initiated.

After the configuration of Network Device A has been updated, the coordination point starts receiving updated NDSI. The updated NDSI includes, among other information, the state of the control plane on Network Device A at various points in time. In this scenario, state of the control plane at time T1 is compared to the corresponding state of the control plane at ST1 that is stored as simulated NDSI in the coordination point database. If the state of the control plane for Network Device A is the same as the state of the control plane obtained during the simulation, then Network Device A may be determined to operating as expected (i.e., in the same manner as simulated) and the process proceeds to step 404. Alternatively, if the state of the control plane for Network Device A is not the same as the state of the control plane obtained during the simulation, then Network Device A may be determined to not be operating as expected (i.e., not in the same manner as simulated); however, in this scenario, the process proceeds to step 404 to perform additional monitoring to determine when the control plane state of Network Device A corresponds to the state of the control plane at ST1.

Said another way, the state of the control plane in Network Device A may be continuously monitored until either: (a) the state of the control plane of Network Device A matches the state of the control plane at ST1 or (b) monitoring has occurred for a period of time and the state of the control plane of Network Device A does not match the state of the control plane at ST1. Once conditions (a) or (b) are met, then the process may proceed to Step 406.

Scenario 3

Consider a scenario in which a simulation of a real network system is performed, where the simulation focused on changes to the data plane in Network Device A. The simulated NDSI generated by the simulation includes information about how a certain set of specially created packets is forwarded between the simulated network devices. After the simulation has been completed and, in accordance with Step 208, an updated configuration for Network Device A is initiated.

After the configuration of Network Device A has been updated, a set of specially created packets are injected into the real network system in the same manner as the simulation. In one or more embodiments of the invention, the coordination point initiates the creation and injection of the specially created packets. Once this occurs, the coordination point starts receiving updated NDSI. The updated NDSI includes, among other information, information about how the specially created packets are being forwarded between the network devices in the real network system. In this scenario, at step 402, a comparison is made between the simulated forwarding behavior and the forwarding behavior exhibited in the real network system. If the simulated and exhibited forwarding behavior is the same, then Network Device A may be determined to be operating as expected (i.e., in the same manner as simulated) and the process proceeds to step 404. Alternatively, if the simulated and exhibited behavior is not the same, then Network Device A may be determined to not be operating as expected (i.e., not in the same manner as simulated) and the process proceeds to step 406.

Continuing with the discussion of FIG. 4, in step 404, a determination is made about whether the coordination point should continue to monitor the updated NDSI from the real network system as part of the method in FIG. 4. Said another way, a determination is made about whether to continue monitoring one or more real network devices in the real network system in order to determine whether they are continuing to operate as expected. If a determination is made to continue monitoring of one or more of the real network devices, then the process proceeds to step 400; otherwise, the process ends.

In step 406, when the behavior of a real network system (or a portion thereof) does not match the simulation of the real network system, then corrective action may be initiated. The corrective action may include, but is not limited to: (a) identifying, using the simulation results and the updated NDSI, one or more hardware and/or software components to modify, and then initiating the modification and (b) sending a notification (e.g., via electronic mail, or any other communication mechanism), where the notification includes one or more portions of the update NDSI and corresponding simulated NDSI, which triggered the notification. If the corrective action includes updating one or more real network devices in the real network system, then after an update occurs, the process may proceed to step 400 for additional monitoring. Alternatively, once the corrective action is performed, the process may end.

In one embodiment of the invention, the corrective action may include updating the configuration of one or more real network devices to a prior state, e.g., using NDSI corresponding to that prior state. For example, the coordination point may periodically checkpoint the NDSI. This results in the NDSI for the real network system to be stored as a checkpoint (or associated with a checkpoint identifier). At some later point in time, the coordination point may revert the real network system to a prior known state by selecting a checkpoint and then initiating an update of the real network system (or portion thereof) using the NDSI associated with the selected checkpoint.

FIGS. 5A-5D show an example in accordance with one or more embodiments of the invention. The example is not intended to limit the scope of the invention.

Turning to the example, consider a scenario in which a coordination point (502) is managing, via a network (506), a real network system (500). The real network system includes four real network devices (Network Device A (508), Network Device B (510), Network Device C (512), and Network Device D (514)). The aforementioned real network devices are connected in accordance with the topology shown in in FIG. 5A.

At some point in time a network operator, using a client device (504), initiates a simulation of the real network system in accordance with the method shown in FIG. 2. Specifically, referring to FIG. 5B, NDSI for the real network system (500) is used to generate virtual instances (also referred to as simulated network devices (508', 510, 512, 514') in FIG. 5B. Prior to performing the simulation, the network operator (via the computing device) provides the following simulation conditions: (i) add proposed simulated network device E (516), (ii) modify the topology of the simulated network devices such that simulated network device A (now referred to as simulated network device A' (508')) is also connected to proposed simulated network device E; and (iii) modify the topology of the simulated network devices such that simulated network device D (now referred to as simulated network device D' (510)) is also connected to proposed simulated network device E. For purposes of clarity, any simulated network device that: (i) does not currently exist in the real network system (500) or (ii) has a configuration that is different than the configuration of the corresponding network device in the real network system (500) is denoted with hatching in FIG. 5B.

Once simulated network system B (500B) has been configured with the aforementioned simulation conditions, a simulation is performed on simulated network system B. For purposes of this scenario, assume that the network operator, after reviewing the simulation results, determines that the configuration of simulated network system B should not be used.

Figure 5A:
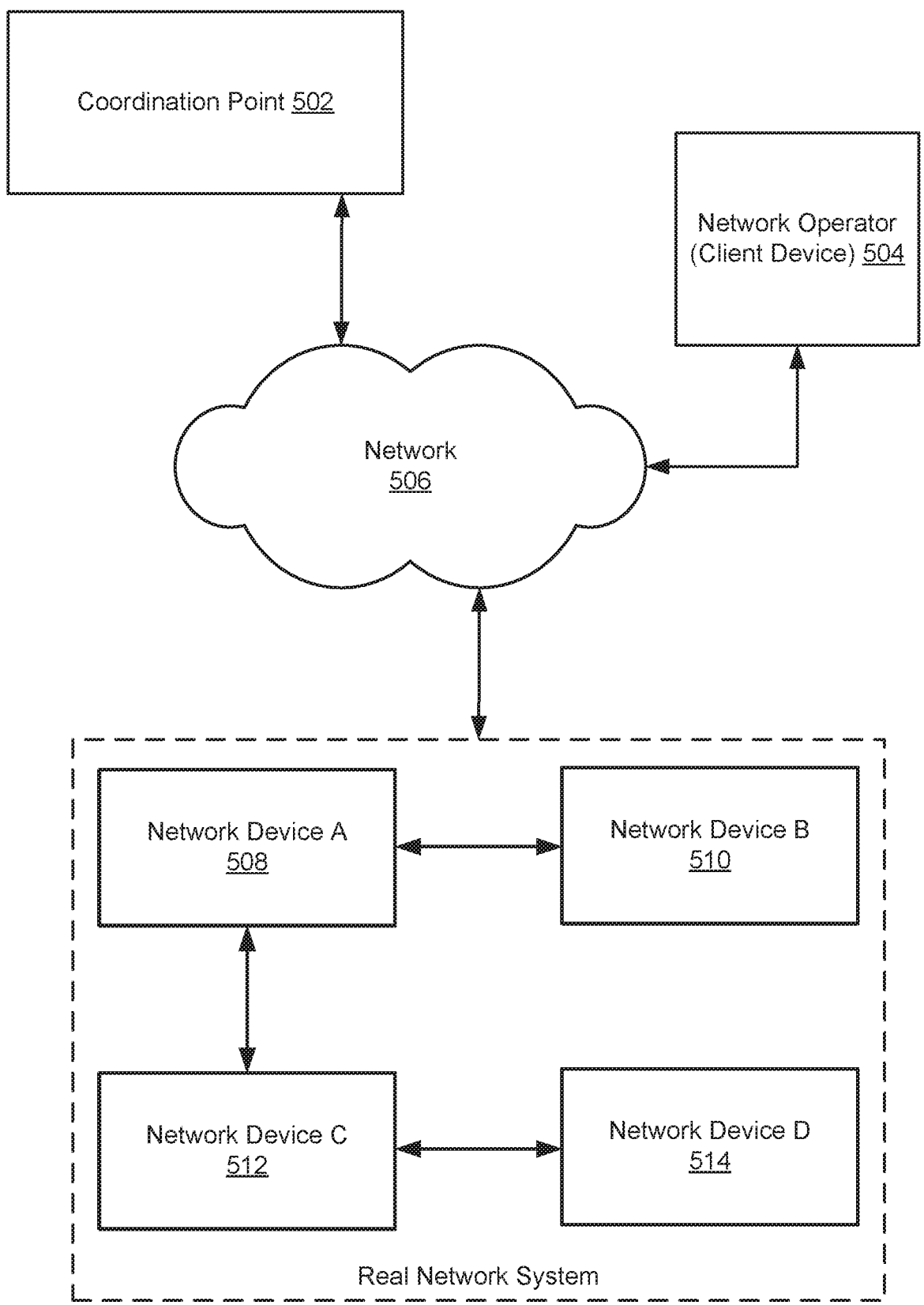
FIGS. 5A-5D show an example in accordance with one or more embodiments of the invention.
Figure 5B:
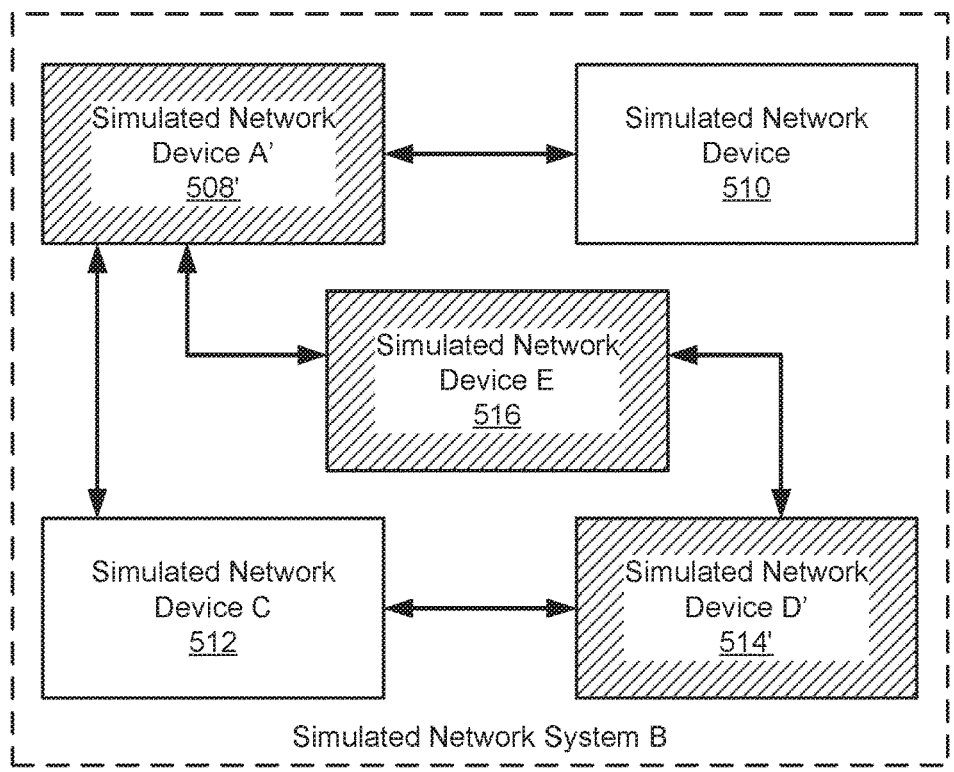
Figure 5C:
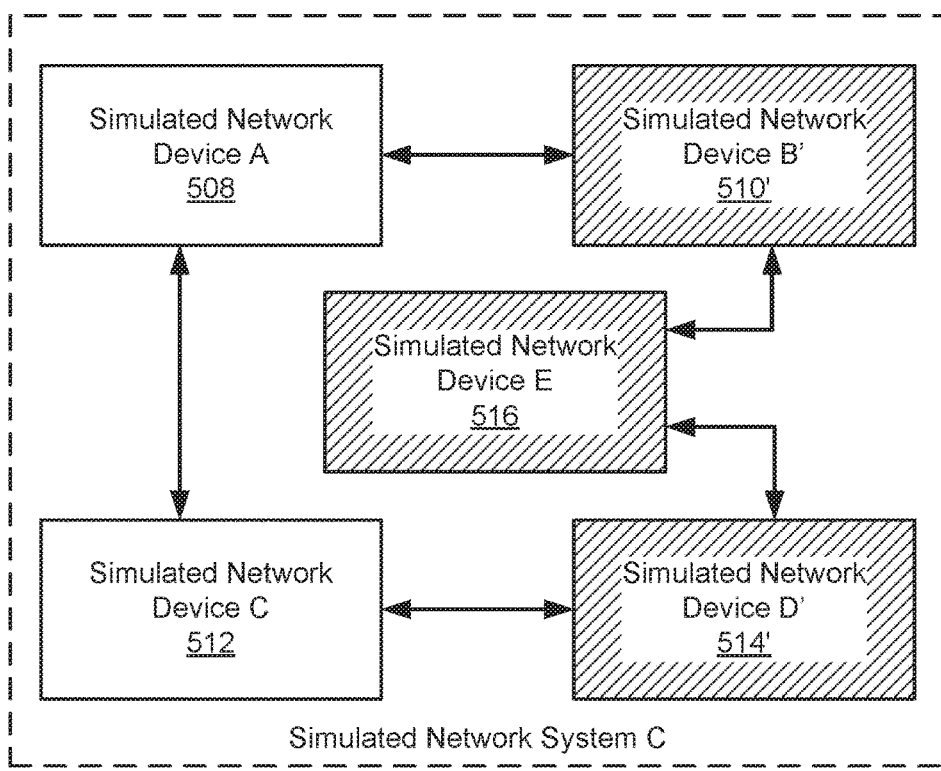

Referring to FIG. 5C, the network operator then proceeds to provide a second set of simulation conditions: (i) add proposed simulated network device E (516), (ii) modify the topology of the simulated network devices such that simulated network device B (now referred to as simulated network device B' (510')) is also connected to proposed simulated network device E; and (iii) modify the topology of the simulated network devices such that simulated network device D (now referred to as simulated network device D' (510')) is also connected to proposed simulated network device E. For purposes of clarity, any simulated network device that: (i) does not currently exist in the real network system (500) or (ii) has a configuration that is different that the configuration of the corresponding network device in the real network system (500) is denoted with hatching in FIG. 5C.

Once simulated network system C (500C) has been configured with the aforementioned simulation conditions, a simulation is performed on simulated network system B. For purposes of this scenario, assume that the network operator, after reviewing the simulation results, determines that the configuration of simulated network system C should be used.

Figure 5D:
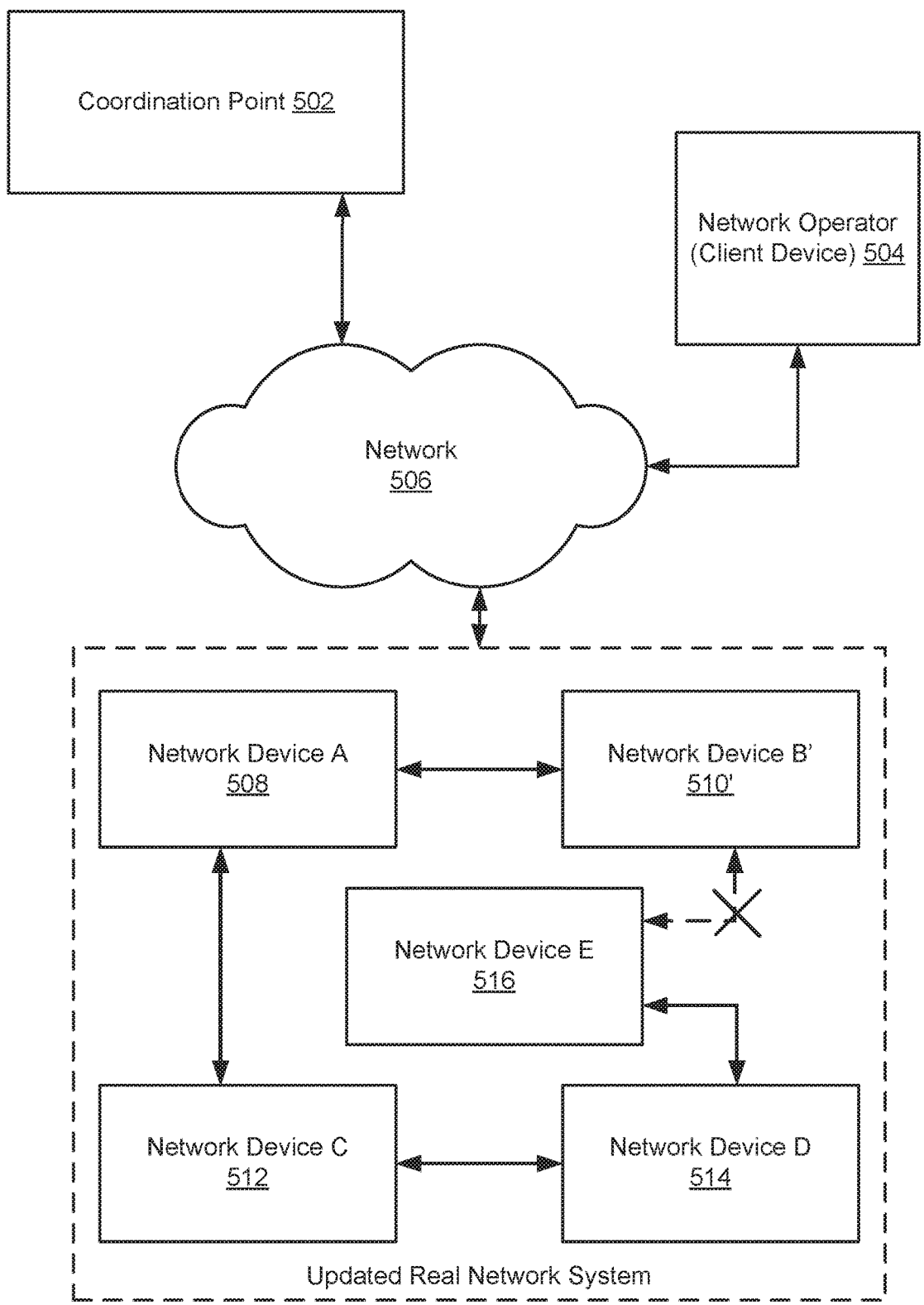

Referring to FIG. 5D, the coordination point (502) initiates the updating of the real network system to obtain an updated real network system (500D). In this scenario, assume that the network operator added network switch E (516) to the updated real network system (500D). Once the update has been completed, the operation of the updated real network system is monitored in accordance with FIG. 4. During the monitoring a determination is made that Network Device B (510') and Network Device E (516) are not operating in a manner that is the same or similar to the simulation. Based on this determining, a notification is issued to the network operator, which includes the NDSI of Network Device B (510') and of Network Device D' (514') along with the corresponding simulated NDSI.

The network operator subsequently determines, using the notification, that the physical connections between Network Device B' and Network Device E were connected improperly. The network operator subsequently corrects the error in the connectivity. Once the error is corrected, monitoring in accordance with FIG. 4 resumes.

In general, embodiments of the invention may enable simulation of the real network devices in a real network system. By using the NDSI for the real network devices, the simulation very closely or almost exactly mirrors the operation of the real network system. This results in more accurate simulation results. The simulation results may then be used to determine how to update the real network system and/or to validate the operation of the real network system. By providing a mechanism to validate the operation of the real network system, embodiments of the invention enable more rapid error detection and subsequent correction, thereby improving performance of the real network system.

Figure 6:
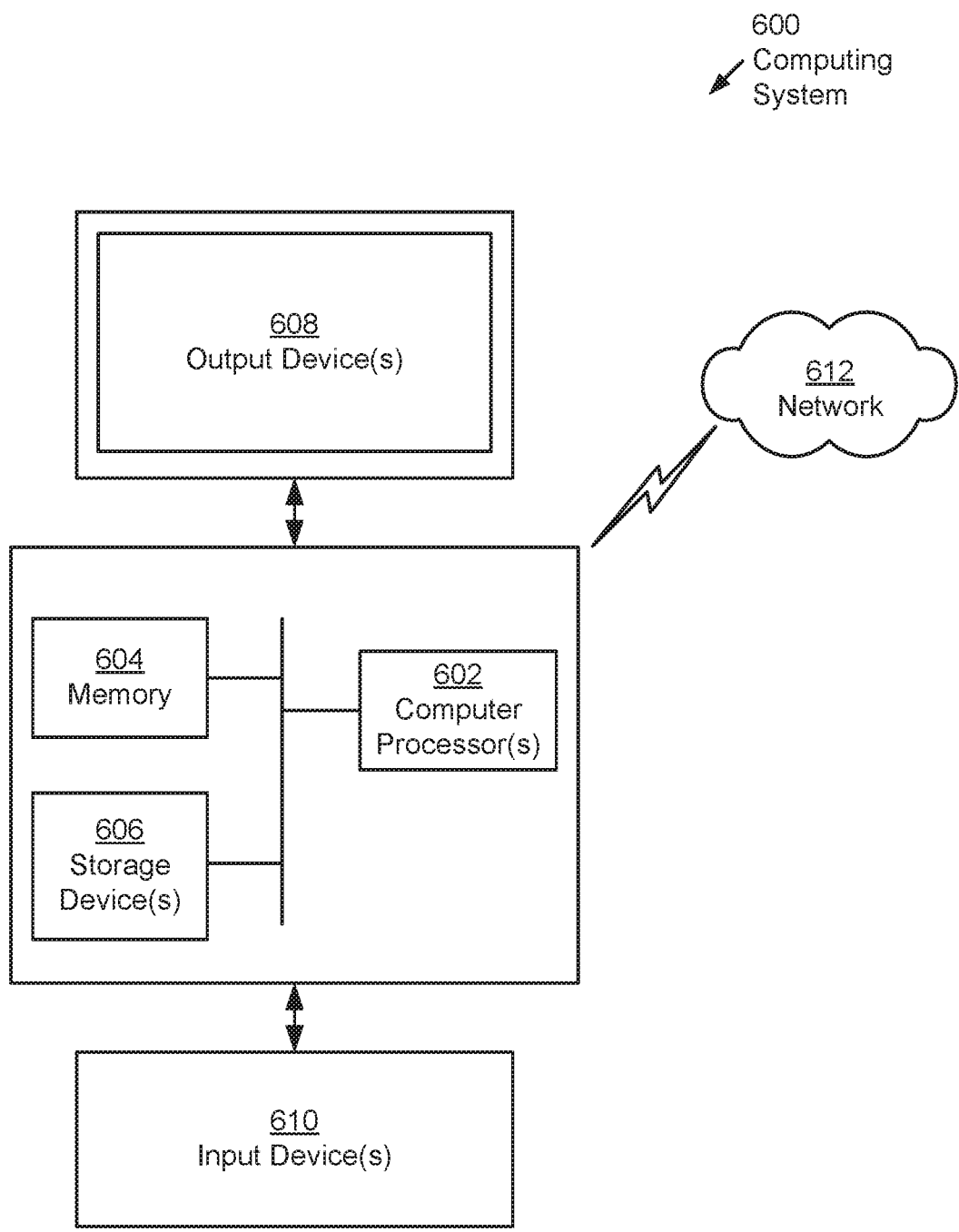
FIG. 6 shows a computing device in accordance with one or more embodiments of the invention.

Embodiments of the invention may be implemented on a computing device. Any combination of mobile, desktop, server, embedded, or other types of hardware may be used. For example, as shown in FIG. 6, the computing device (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing device (600) may also include one or more input device(s) (610), such as a touchscreen, keyboard, mouse, microphone, touchpad, electronic pen, or any other type of input device. Further, the computing device (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing device (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing devices exist, and the aforementioned input and output device(s) may take other forms.

Software instructions in the form of computer readable medium program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, on or more elements of the computing device (600) may be located at a remote location and connected to the other elements over a network (612). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a real network system, comprising:

configuring, using Network Device State information (NDSI) for at least a portion of the real network system, a plurality of simulated network devices for a simulated network system, wherein the NDSI comprises: a state of a control plane at points in time for network devices in the at least the portion of the real network system; a version of software and a version of firmware executing on the at least the portion of the real network system; and routing information and data plane state information for the at least a portion of the real network system;

obtaining simulation conditions for the simulated network system;

simulating, using the simulation conditions, operation of the simulated network system to obtain a simulation result;

initiating an update of at least a portion of the real network system corresponding to the simulated network system;

after the updating of at least the portion of the real network system has been completed:

monitoring the real network system to obtain updated NDSI;

determining, based on the simulation result and the updated NDSI, that operation of the real network system is not consistent with simulated operation of the simulated network system; and based on the determination, initiating a corrective action on the real network system.

2. The method of claim 1, further comprising:

after the updating of at least the portion of the real network system has been completed:

obtaining NDSI for a network device in the real network system;

determining that the NDSI for the network device does not match corresponding simulated NDSI in the simulation result; and based on the determination, initiating a corrective action on the real network system.

3. The method of claim 2, wherein the corrective action comprises initiating an update of the network device.

4. The method of claim 2, wherein the corrective action comprises initiating an update of a second network device in the real network system and wherein the second network device is identified using, at least in part, the simulation result.

5. The method of claim 2, wherein the corrective action comprises issuing a notification to a user of the real network system, wherein content in the notification is based, at least in part, on the simulation result.

6. The method of claim 2, wherein the network device is a router, a switch, or a multi-layer switch.

7. The method of claim 1, wherein configuring the plurality of simulated network devices for the simulated network system comprises:

obtaining NDSI for a network device in the real network system;

instantiating a virtual instance; and configuring, using the NDSI for the network device, the virtual instance to simulate the network device.

8. The method of claim 7, wherein the virtual instance is a container or a virtual machine.

9. The method of claim 7, wherein the virtual instance simulates operation of hardware and software of the network device.

10. The method of claim 1, wherein configuring the plurality of simulated network devices for the simulated network system comprises:

instantiating a virtual instance; and configuring, using user configuration parameters, the virtual instance to simulate a network device, wherein the network device is a network device in the real network system or a proposed network device to be added to the real network system.

11. The method of claim 1, wherein initiating the corrective action on the real network system comprises initiating an update of the real network system to a prior checkpoint state.

12. The method of claim 1, wherein the simulation conditions place at least one of the plurality of simulated network devices in a failed state.

13. The method of claim 1, wherein the simulation conditions modify a topology of the plurality of simulated network devices.

14. The method of claim 13, wherein modifying the topology of the plurality of simulated network devices comprises adding an additional simulated network device to the plurality of simulated network devices, wherein at least one of the plurality of simulated network devices is configured to communicate with the additional simulated network device.

15. The method of claim 1, wherein the simulation conditions modify a configuration of at least one of the plurality of simulated network devices.

16. A coordination point, comprising:

a network state database comprising network device state information (NDSI) for a real network system, wherein the NDSI comprises:

a state of a control plane at points in time for network devices in the real network system;

a version of software and a version of firmware executing on the network devices in the real network system; and routing information and data plane state information for the at least a portion of the real network system;

a processor and memory comprising instructions, which when executed by the processor, enables the coordination point to:

configure, using the NDSI, a plurality of simulated network devices for a simulated network system;

obtain simulation conditions for the simulated network system;

simulate, using the simulation conditions, operation of the simulated network system to obtain simulated NDSI; and wherein the coordination point is configured to initiate, based on the simulated NDSI, an update of at least a portion of a real network system corresponding to the simulated network system, after the updating of at least the portion of the real network system has been completed:

monitoring the real network system to obtain updated NDSI;

determining, based on the simulation result and the updated NDSI, that operation of the real network system is not consistent with simulated operation of the simulated network system; and based on the determination, initiating a corrective action on the real network system.

17. The coordination point of claim 16, wherein configuring the plurality of simulated network devices for the simulated network system comprises:

obtaining NDSI for a network device in the real network system;

instantiating a virtual instance wherein the virtual instance is a container or a virtual machine; and configuring, using the NDSI for the network device, the virtual instance to simulate the network device.

18. A non-transitory computer readable, medium comprising instructions, which when executed by a processor, perform a method, the method comprising:

configuring, using Network Device State Information (NDSI) for at least a portion of a real network system, a plurality of simulated network devices for a simulated network system, wherein the NDSI comprises:

a state of a control plane at points in time for network devices in the at least the portion of the real network system; and a version of software and a version of firmware executing on the at least the portion of the real network system; and routing information and data plane state information for the at least a portion of the real network system:

obtaining simulation conditions for the simulated network system;

simulating, using the simulation conditions, operation of the simulated network system to obtain a simulation result;

initiating an update of at least a portion of the real network system corresponding to the simulated network system;

after the updating of at least the portion of the real network system has been completed:

monitoring the real network system to obtain updated NDSI;

determining, based on the simulation result and the updated NDSI, that operation of the real network system is not consistent with simulated operation of the simulated network system; and based on the determination, initiating a corrective action on the real network system.

19. A method for managing a real network system, comprising:

configuring, using Network Device State Information (NDSI) for at least a portion of the real network system, a plurality of simulated network devices for a simulated network system, wherein the NDSI comprises:
- a state of a control plane at points in time for network devices in the at least the portion of the real network system;
- a version of software and a version of firmware executing on the at least the portion of the real network system; and routing information and data plane state information for the at least a portion of the real network system;

obtaining simulation conditions for the simulated network system;

simulating, using the simulation conditions, operation of the simulated network system to obtain a simulation result; and issuing a notification to a user of the real network system, wherein content in the notification is based, at least in part, on the simulation result, after issuing the notification to the user of the real network system has been completed:

monitoring the real network system to obtain updated NDSI;

determining, based on the simulation result and the updated NDSI, that operation of the real network system is not consistent with simulated operation of the simulated network system; and based on the determination, initiating a corrective action on the red network system.

20. The method of claim 19, wherein the simulation conditions specify adding an additional simulated network device to the plurality of simulated network devices, and wherein at least one of the plurality of simulated network devices is configured to communicate with the additional simulated network device.

* * * * *